United States Patent
Greywall

(10) Patent No.: US 6,201,631 B1
(45) Date of Patent: Mar. 13, 2001

(54) PROCESS FOR FABRICATING AN OPTICAL MIRROR ARRAY

(75) Inventor: Dennis Stanley Greywall, Whitehouse Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/559,216

(22) Filed: Apr. 26, 2000

Related U.S. Application Data

(63) Continuation of application No. 09/415,283, filed on Oct. 8, 1999.

(51) Int. Cl.[7] ................................................. G02F 1/03
(52) U.S. Cl. .................. 359/245; 359/290; 359/295; 359/223; 359/230; 438/52; 335/222; 345/84
(58) Field of Search ............................... 359/290, 291, 359/295, 223, 224, 245, 248, 230, 214; 438/52, 72; 345/84; 335/222, 223, 229

(56) References Cited

U.S. PATENT DOCUMENTS

| | | | |
|---|---|---|---|
| 4,421,381 | * 12/1983 | Ueda et al. ........................ | 359/214 |
| 5,629,790 | 5/1997 | Neukermans et al. ............... | 359/198 |
| 5,629,794 | * 5/1997 | Magel et al. ....................... | 359/290 |
| 5,661,591 | * 8/1997 | Lin et al. ........................... | 359/290 |
| 5,673,139 | 9/1997 | Johnson ............................. | 359/291 |
| 5,912,608 | * 6/1999 | Asada ................................ | 335/222 |
| 5,914,801 | 6/1999 | Dhuler et al. ...................... | 359/230 |
| 5,920,417 | 7/1999 | Johnson ............................. | 359/223 |
| 6,071,752 | * 6/2000 | Furlani et al. ..................... | 438/52 |

* cited by examiner

Primary Examiner—Loha Ben
(74) Attorney, Agent, or Firm—Richard J. Botos

(57) ABSTRACT

An electro-optic device which includes a mirror array attached to a base substrate is disclosed. The mirror array comprises a substrate having a plurality of spaced-apart mirrors with underlying cavities (each having a diameter at least about the same size as that of the overlying mirror) formed therein. The base substrate includes a plurality of electrodes as well as a plurality of electrical interconnections. The mirror array is attached to the base substrate so that each mirror of the array as well as a cavity are supported above a set of electrodes. Each mirror of the mirror array rotates relative to the major plane of the substrate in response to an electrical signal. The application of an electrical potential to each mirror relative to at least one electrode of the set of electrodes causes the desired rotation (depending on the magnitude of the electrical potential) up to an angle of about 20 degrees.

9 Claims, 3 Drawing Sheets

PROCESS FOR FABRICATING AN OPTICAL MIRROR ARRAY

STATEMENT OF RELATED APPLICATION

This application is a continuation application of U.S. Ser. No. 09/415,283, filed on Oct. 8, 1999 which is hereby incorporated by reference.

FIELD OF THE INVENTION

The present invention relates generally to optical communication systems and more particularly to an optical device having a mirror array.

DESCRIPTION OF THE RELATED ART

Electro-optic devices often employ an array of micromachined mirrors, each mirror being individually movable in response to an electrical signal. For example, the mirrors can each be cantilevered and moved by an electrostatic force. Typically, electro-optic mirror array devices can be used as, for example, optical cross connects in optical communication systems, visual presentations and displays. Generally, each mirror of the cross-connect is addressed by a number of electrical lead lines and receives a beam of light from, for example, an individual optical fiber in a fiber optic bundle. The beams of light reflected from the mirrors are individually directed to a prespecified location (for example, another fiber optic bundle) by individually moving the mirrors.

It is desirable to have a high density of optical transfer, meaning that mirrors having the desired diameter be spaced as close as possible. Spacing the mirrors as close as possible is problematic because each mirror typically requires a support structure. The electrical interconnection density can also present a serious bottleneck. As the number of mirrors in a tilting array increases, the number of electrical lead lines also increases, and these lead lines must be crowded into confined spaces. For example, a 256 mirror array chip (16×16 array) with four lead lines per mirror requires 1032 wirebond pads and electrical interconnections. The electrical leads must be adequately spaced to handle relatively high voltage (e.g., 100–150 volts). Hence there is a limit as to how small the leads can be made and how closely they can be spaced apart from each other. The routing of this number of electrical wires between the individual mirror elements, and routing from the chip center to the outer edge, forces the mirror spacing to be larger than desired and limits the useful size of the integrated array.

What is needed is an electro-optic device which includes a larger array of mirrors while not increasing the mirror spacing.

SUMMARY OF THE INVENTION

The present invention is directed to a process for fabricating an electro-optic device that includes a mirror array and a base substrate. The mirror array is a substrate having a plurality of spaced-apart mirrors thereon. The substrate also has cavities formed therein. The cavities are associated with and underlie individual mirrors. The cavities are configured to permit the overlying mirrors to rotate out of plane and thus be partially disposed in the cavity. The base substrate includes a plurality of electrodes as well as a plurality of electrical interconnections.

The mirror array is attached to the base substrate so that each mirror of the array as well as a cavity are supported above a set of electrodes. Each mirror of the mirror array rotates relative to the major plane of the substrate in response to an electrical signal. The application of an electrical potential to each mirror relative to at least one electrode of the set of electrodes causes the desired rotation (depending on the magnitude of the electrical potential) up to an angle of about 20 degrees.

The mirror array and cavity are defined in the substrate by providing a substrate in which two layers of semiconductor material are separated by a layer of oxidized semiconductor material. Such substrates are used because of the difference in etch resistance between the semiconductor material and the oxidized semiconductor layer. Specifically, the semiconductor material etches much faster in certain etch expedients (e.g. reactive ion etching (RIE)) than the oxidized semiconductor material. Similarly, the oxidized semiconductor material etches much faster in other etch expedients (e.g. fluorine-containing wet chemical etchants such as aqueous HF) than the semiconductor material. This difference in etch rates, termed etch selectivity, is exploited to fabricate the mirror array in the semiconductor substrate.

Examples of suitable substrates include silicon on insulator substrates. Silicon on insulator substrates (e.g. commercially available Simox substrates) are well known to one skilled in the art and are not discussed in detail herein. Silicon on insulator substrates typically have first and second silicon layers separated by a layer of silicon dioxide ($SiO_2$). The silicon is either single crystalline silicon or polycrystalline silicon. Germanium compensated boron-doped silicon is also contemplated as suitable. With such substrates, the silicon left standing after patterning the mirrors therein is single crystal and stress free. The silicon does not curl, which is extremely important for mirror applications.

The substrates have a top layer of silicon that has a thickness from a few microns to about 50 microns. The intermediate layer, which acts as an etch stop for the silicon layers on either side, has a thickness in the range of several hundred nanometers (e.g. about 100 nm to about 500 nm). The base silicon layer has a thickness of several hundred microns (e.g., about 100 microns to about 500 microns).

A cavity is etched in the base silicon layer using a standard, anisotropic etching technique such as reactive ion etching (RIE). This etch automatically stops at the intermediate etch stop layer.

The mirror elements in the mirror array are then defined in the top silicon layer. The mirrors have torsional members, which permit the mirror elements to rotate in response to an actuating electrostatic force. In one embodiment, the mirror element is a mirror coupled to a gimbal via two torsional members. The torsional members are on opposing sides of the mirror and together define the mirror's axis of rotation. The gimbal, in turn is coupled to a support portion of the top silicon layer via two torsional members. The torsional members are on opposing sides of the gimbal and together define the gimbal's axis of rotation. The torsional members that couple the mirror to the gimbal are orthogonal to the torsional members that couple the gimbal to the substrate. The torsional members are also defined lithographically.

In a lithographic process for patterning a silicon layer, a layer of energy sensitive material is formed on the top silicon layer. An image of a pattern defining the mirror elements and torsional members is introduced into the energy sensitive material. The image is developed into a pattern. The pattern is then transferred into the underlying silicon layer using a conventional anisotropic etchant such as RIE with a chlorine etchant.

The lithographic techniques used to define the mirror elements and the torsional members are standard techniques well known to one skilled in the art. As such, these techniques are not discussed in detail herein.

The mirror element has a location in the top layer that corresponds to the location of a cavity in the base layer. The correspondence is such that, when the mirror element rotates out of the plane of the top layer, the mirror element is partially disposed in the cavity underlying the mirror element.

The intermediate etch stop layer underlying the mirror element and torsional members is then removed. A wet chemical etchant is contemplated as suitable for removing the etch stop layer. For the embodiment wherein the etch stop layer is $SiO_2$, the wet chemical etchant is aqueous HF. After the etch stop layer is removed from underneath the mirror element, the mirror is free standing. In those embodiments that require the mirrors to have enhanced reflectivity, metal or dielectric materials are deposited on the mirrors. Because the mirror surface is exposed through the cavity in the base substrate layer, such materials are readily deposited on both sides of the mirror. Depositing such materials on both sides of the mirror reduces the stress and associated distortions that result when such materials are deposited on only one side of the layer.

A second substrate is provided that has metal electrodes formed thereon. The electrodes are configured to control the rotation of the mirror independently from the rotation of the gimbal. The second substrate also has electrical contacts formed thereon. The first substrate is bonded to the second substrate. Suitable bonding techniques include fusion bonding, flip chip bonding and epoxy bonding.

The electrical contacts are configured for electrical interconnection to a source. Circuitry is provided to supply an electrical potential from the contact to the designated electrode. Depending on the amount of electrical potential, the electrostatic force generated between the electrode and the mirror element causes either the mirror, the gimbal or both to rotate.

To maintain the mechanical integrity of the mirror array, the center-to-center spacing between mirrors should be on the order of about 20% larger than the mirror diameter, permitting tight packing for the mirror array. The height of each cavity is preferably at least about 10 $\mu$m (micrometers). Large cavity heights permit the use of large diameter mirrors (greater than about 500 $\mu$m) as well as large rotation angles for such mirrors (up to 20 degrees). Each mirror has a thickness greater than about 2 $\mu$m (micrometers). Thicker mirrors (greater than about 2 $\mu$m) are desirable because they are less prone to warping. However, the desire for thicker mirrors that do not warp is counter-balanced by weight constraints. Specifically, for mirrors with the same cross-sectional area, thicker mirrors are simply heavier. The heavier the mirror, the more force that is required to rotate the mirror. Also, heavier mirrors rotate more slowly. Therefore a balance must be struck between a mirror that is thick and heavy enough to resist warping yet not so thick that it cannot be moved with the requisite speed.

Other objects and features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

Figure 1:
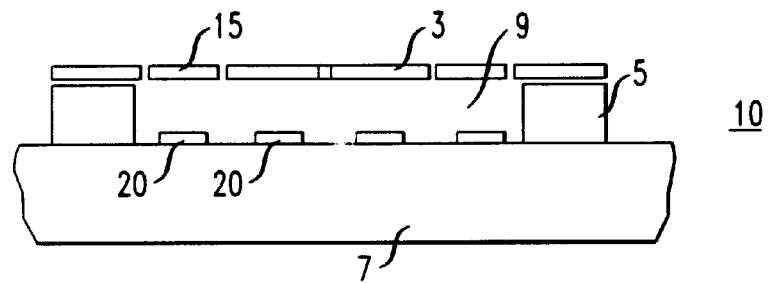
FIG. 1 is a cross-sectional view of an electro-optic device of the present invention.

The present invention is directed to an electro-optic device 10 useful for an optical communication system. Referring to FIG. 1, the electro-optic device 10 includes a mirror 3 and a base substrate 7. The mirror 3 is supported by a substrate 5. A cavity 9 underlies mirror 3. The cavity has a diameter at least about the same size as that of the overlying mirror 3. The base substrate 7 includes a plurality of electrodes 20 as well as a plurality of electrical interconnections (not shown).

The height of each cavity 9 depends on the size of the mirror 3. Typically, for either a square mirror with side lengths of about 500 $\mu$m (micrometers) or a circular mirror with a diameter of 500 $\mu$m, the cavity height should be at least about 20 $\mu$m.

Figure 2:
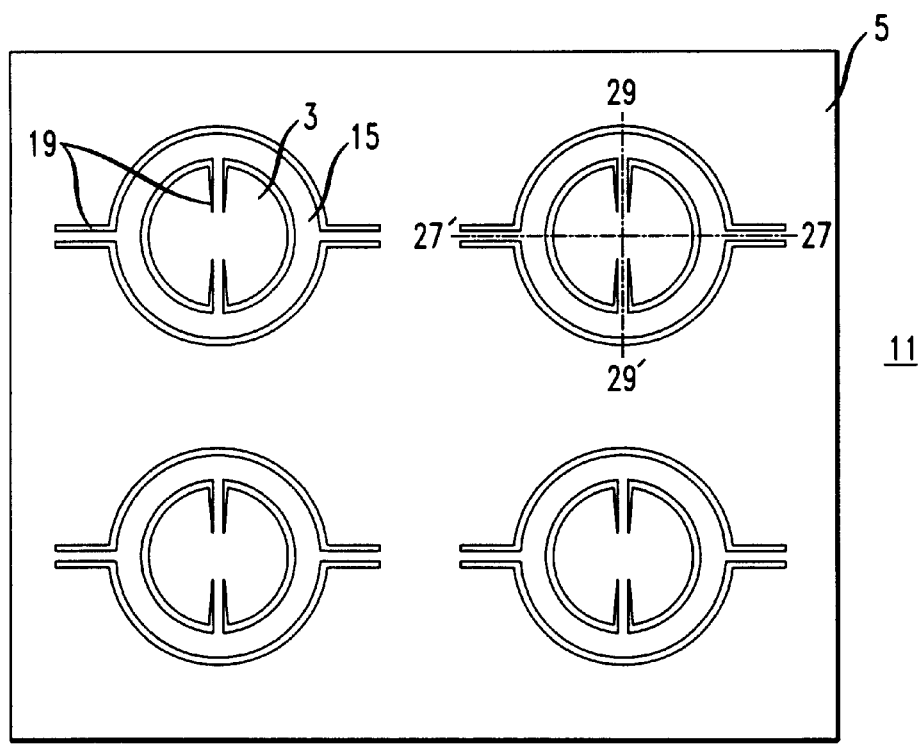
FIG. 2 is a top view of the electro-optic device depicted in FIG. 1.

The mirror array 3 is attached to the base 7 so that the mirror 3 is supported above a set of electrodes. The mirror 3 is supported above the set of electrodes with a supporting structure 15 (e.g., a gimbal). Referring to FIG. 2, the supporting structure 15 includes pairs of torsional members (depicted as rods) 19. A first pair of torsional members 19 couple the mirror 3 to the supporting structure 15. A second pair of torsional members 19 couple the supporting structure 15 to the substrate 5. The two pairs of torsional members 19 are positioned perpendicular to each other, providing rotation about two axes.

The mirror 3 of the mirror array 11 rotates relative to the major plane of the substrate 5 in response to an electrical signal. The application of an electrical potential to the mirror 3 relative to at least one electrode 20 in the cavity 9 causes the mirror to move. Movement is about the axis defined by a pair of torsional members. The degree of rotation (depending on the magnitude of the electrical potential) is up to an angle of about 20 degrees from the mirror's planar position. Thus, the mirror rotates or tilts out of plane up to about 20 degrees.

To maintain the mechanical integrity of the mirror array, the center-to-center spacing between mirrors should be on the order of about 20 percent larger than the mirror diameter, permitting tight packing for the mirror array. The height of each cavity is preferably at least about 10 $\mu$m (micrometers). Large cavity heights permit the use of large diameter mirrors (greater than about 500 $\mu$m) as well as large rotation angles for such mirrors (up to 20 degrees). Each mirror has a thickness greater than about 2 $\mu$m (micrometers). Thicker mirrors (greater than about 2 $\mu$m) are desirable because they are less prone to warping.

Figure 3:
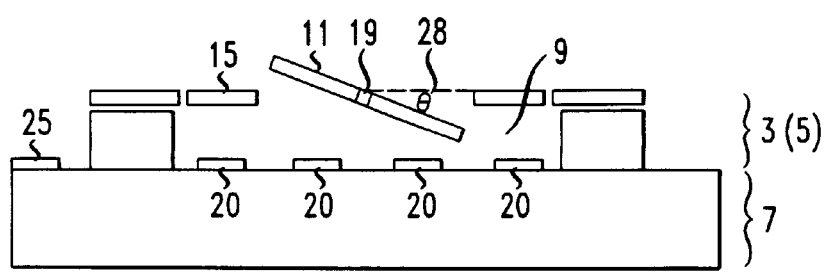
FIG. 3 is a cross-sectional view of the electro-optic device of FIG. 1 rotated toward an underlying electrode.

The operation of the electro-optic device 10 shown in FIG. 1 is further illustrated with reference to FIG. 3. The supporting structure 15 (e. g., gimbal) for example holds the mirror 11 in the plane of the substrate 5. Angle 28 between the mirror 11 and the substrate 5 is controlled by deflecting either the mirror 11 and/or the supporting structure 15 towards one or more of the electrodes 20, as previously described. The deflection is controlled by adjusting the electrical potential applied between the mirror 11 and one or more of the electrodes 20 and/or the supporting structure 15 and one or more of the electrodes 20.

The angle of rotation for the mirror 11 and/or the supporting structure 15 depends on the size and polarity of the potential difference established between the mirror 11, the supporting structure 15 and electrodes 20. Generally, potential differences in the range of about 1 volt to about 300 volts generate angles of rotation of about 0 degree to about 20 degrees.

Applying different potentials between the mirror 11 and the electrodes 20 relative to the supporting structure 15 and the electrodes 20, the mirror 11 tilts about more than one axis. For example, referring to FIG. 2, the mirror 3 tilts about two axes. One axis is denoted as 29–29'. The other axis is denoted as 27–27'. Both axis bisect mirror 3. Axis 29–29' and 27–27' are orthogonal to each other.

Both the mirrors and the supporting structure are preferably conductive to facilitate establishing the desired rotation. However, it is possible to use mirrors and supporting structures that are not particularly electrically conductive and to use conductive layers (e.g., electrodes) formed on regions thereof to effect the desired rotation.

Figure 4:
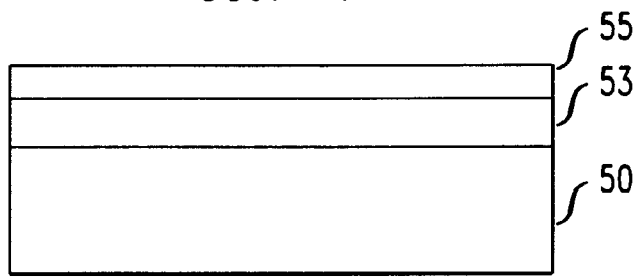
FIG. 4 is a cross-sectional view of a silicon-oxide-silicon substrate.

The electro-optic device 10 could be fabricated using several methods. In one example, referring to FIG. 4, the mirror array is fabricated by providing a silicon-oxide-silicon substrate. Suitable silicon-oxide-silicon substrates typically include a bottom silicon layer 50 (50–500 $\mu$m thick), an oxide layer 53 (0.1–2 $\mu$m thick) and a top silicon layer 55 (2–4 $\mu$m thick). The silicon layers 50, 55 are doped as appropriate. The top layer of the silicon-oxide silicon substrate is optionally made of a low stress material (e.g., polysilicon) suitable for preventing warping of structures formed therein. Suitable materials for the oxide layer include silicon oxide.

The mirrors 11 and the supporting structure 15 are formed in the top silicon layer 55, while the cavities 9 are formed in the bottom silicon layer 50. A method for forming mirrors and cavities in a silicon-oxide-silicon substrate is disclosed in U.S. Pat. No. 5,629,790 to Neukermans et al., which is hereby incorporated by reference. The oxide layer 53 electrically isolates the two conductive silicon layers 50, 55. The oxide layer also acts as a process etch stop when the mirrors, supporting structures, and cavities are formed.

Figure 5:
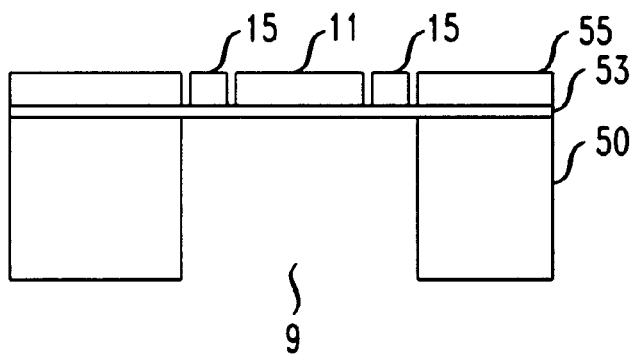
FIG. 5 is a cross-sectional view of the silicon-oxide-silicon substrate of FIG. 4 with a cavity, a mirror, and a supporting structure formed therein.

Referring to FIG. 5, the cavities are formed by etching the bottom silicon layer 50 from the back side down to the oxide layer 53. The cavities are defined using conventional lithographic techniques well known to one skilled in the art. The cavities are formed by patterning a layer of material over layer 50. The patterned layer is then transferred into the underlying silicon layer 50. A conventional etch expedient is used to effect the pattern transfer. Silicon dioxide layer 53 functions as an etch stop. One suitable etching method is a deep-reactive-ion-etch process (DRIE) described in U.S. Pat. No. 5,501,893, which is incorporated by reference herein. Alternatively, the cavities are formed by wet etching the bottom silicon layer 50 using a suitable etchant. After the cavities are formed, the mirrors and the supporting structures are formed in the top silicon layer 55 down to the oxide layer 53.

The mirrors 11, supporting structure 15 and torsional members 19 are defined in the top silicon layer 55. Lithographic techniques well known to one skilled in the art are used to define the mirrors 11, supporting structure 15 and torsional members 19. These lithographic techniques are therefore not discussed in detail herein. Specifically, a patterned layer of material is formed over the silicon layer. The pattern is then transferred into the top silicon layer 55 using standard etching expedients well-know to one skilled in the art. The etch stops at the silicon dioxide layer 53 underlying the top silicon layer 55.

After the cavities, mirrors, and supporting structures are formed, the oxide layer is removed by wet etching in an appropriate etchant. After the oxide layer is removed, the mirrors 11 and supporting structure 15 are capable of limited rotation about their axis.

Figure 6:
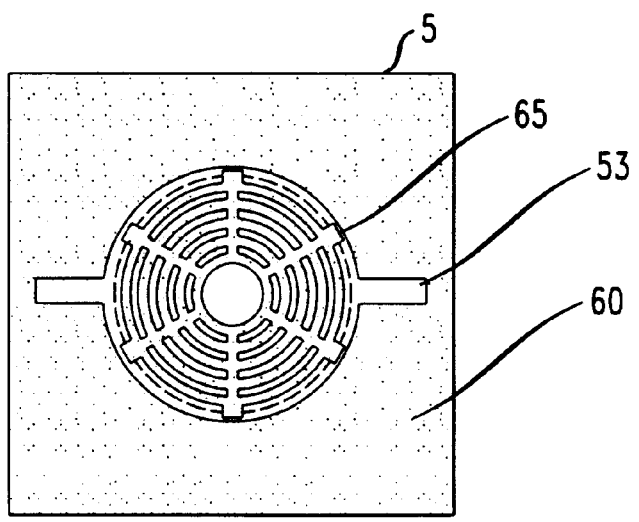
FIG. 6 is a top view of a cavity having a cradle structure formed therein.

Particularly, for large mirrors (greater than about 400 $\mu$m×400 $\mu$m), one may want to avoid DRIE etching all of the material in the large cavities. Alternatively, a cradle structure 60 is formed in the region of the cavity 9 as shown in FIG. 6. The cradle structure 60 is etched down to the oxide layer 53 and preferably has a size approximating 50% of the area of the cavity 9. The shape of the cradle structure 60 is a matter of design choice.

The cradle structure 60 is used to hold the mirrors and support structures in place until the oxide layer 53 is removed. The purpose of cradle 60 is two-fold. First, the cradle reduces the amount of silicon that must be dissolved to form the cavity 9. Second, the cradle provides support for these structures until the oxide layer and cradle structure are removed. When the oxide layer 53 is removed, the cradle structure 60 attached thereto is also removed. The cradle structure 60 optionally includes large features 65 near the edges of the cavities which are the last areas to be underetched, due to their size. Such features 65 support the weight of the cradle structure 60 preventing the torsional members coupled to the mirrors from becoming stressed.

Figure 7A:
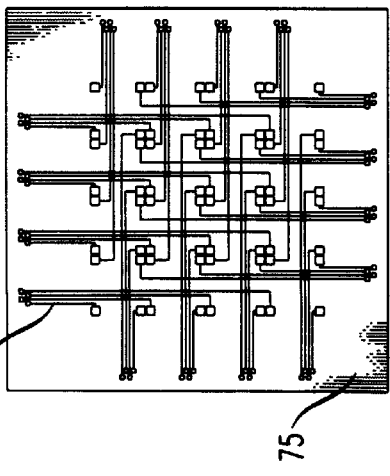
FIGS. 7a–e depict process steps for forming the electrodes and interconnects.
Figure 7B:
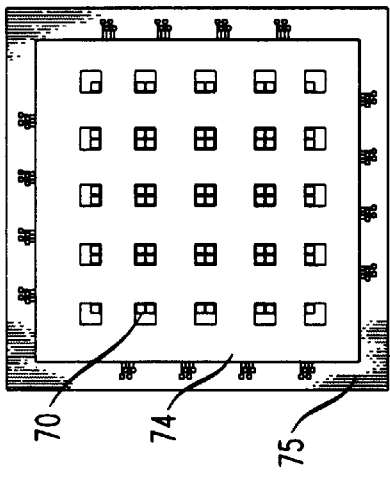
Figure 7C:
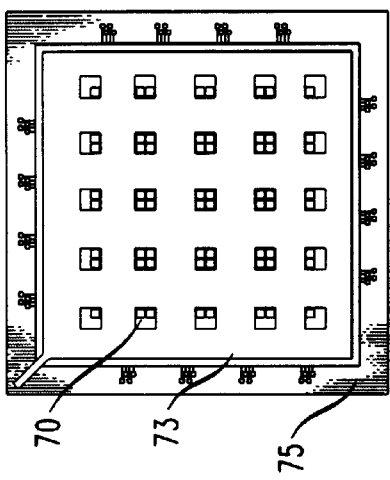
Figure 7D:
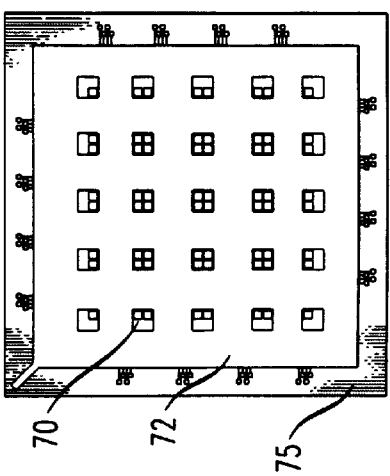
Figure 7E:
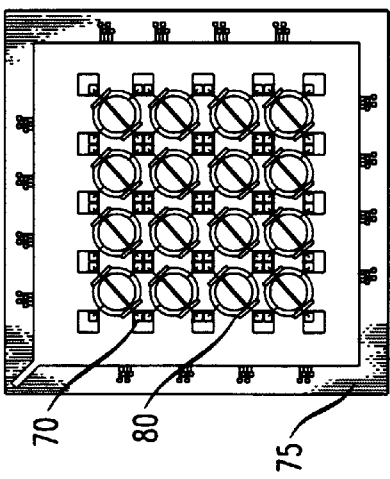

On a base substrate, electrodes and interconnects are patterned and deposited. Referring to FIG. 7a, interconnects 70, made of a metal (Au or Al) or doped polysilicon, are formed on the substrate 75. A multilayer stack of a conductive layer 73 formed between two insulating layers 72, 74 is formed thereover (FIGS. 7b, 7c, and 7d). Pairs of electrodes 80, made of a metal (Au or Al) or doped polysilicon, are formed on the multilayer stack (FIG. 7e) with electrical connection made to interconnects 70.

In an alternate embodiment the electrodes and interconnects are separated by a conductive ground plane. The interconnect and electrodes are electrically interconnected through holes in the ground plane.

Thereafter, the two sets of substrates are attached one to another using fusion bonding, flip-chip bonding, or epoxies. Each mirror and supporting structure is located over an isolated cavity. This greatly reduces mechanical crosstalk between mirrors via the ambient gas. It also means that pneumatic coupling can be used more efficiently to control ringing.

The following example is provided to illustrate a specific embodiment of the present invention.

EXAMPLE

An electro-optic device having the structure depicted in FIG. 2 was modeled. The array of cavities were assumed to be circular, with center-to-center spacings of about 1.0 mm. Based on the center-to center cavity spacings of about 1.0 mm, each mirror of the array had a diameter of about 650 $\mu$m. The outer diameter of the support structure (gimbal) was about 815 $\mu$m.

Assuming that each mirror had a thickness of about 2 μm, the torsional members coupling the mirror to the supporting structure had lengths of about 175 μm, and the torsional members coupling the supporting structure to the substrate had lengths of about 295 μm. Based on the dimensions of the mirrors and supporting structure the gap spacing between the mirror and the bottom of the cavity was assumed to be about 165 μm.

Semicircular electrodes each having a radius of about 175 μm were positioned in the cavities below the mirror.

Calculations determined that a potential of about 200 volts applied between one mirror and one underlying electrode would tilt the mirror at an angle of about 14 degrees.

The invention claimed is:

1. A process for fabricating an electro-optic device comprising:
   providing a first substrate having a first layer of semiconductor material and a second layer of semiconductor material separated by a layer of an oxidized semiconductor material;
   forming a cavity in the first layer of semiconductor material wherein the cavity terminates at the layer of oxidized semiconductor material;
   defining a mirror element in the second layer of semiconductor material wherein the mirror element has a location in the second layer of material that corresponds to the location of the cavity in the first layer of material and wherein the mirror element has first and second major surfaces;
   removing the layer of oxidized material between the mirror element and the cavity;
   providing a second semiconductor substrate having electrodes formed thereon; placing the first substrate in contact with the second substrate so that the electrodes on the second substrate are under the mirror element in the first substrate and disposed in the cavity in the first substrate; and
   bonding the first substrate to the second substrate.

2. The process of claim 1 wherein the first and second semiconductor layers are silicon and wherein the silicon is selected from the group consisting of single crystal silicon and polycrystalline silicon.

3. The process of claim 2 wherein the first and second semiconductor layers are doped to be conductive.

4. The process of claim 1 wherein the semiconductor substrate is a silicon on insulator substrate.

5. The process of claim 1 wherein the mirror element is defined in the second layer of semiconductor material by forming a layer of energy sensitive material over the second layer of semiconductor material, delineating a pattern in the energy sensitive resist material and transferring the delineated pattern into the underlying layer of semiconductor material.

6. The process of the claim 1 wherein the mirror element is connected to the second layer of semiconductor material via a plurality of torsional members.

7. The process of claim 1 wherein the mirror element comprises a mirror and a supporting structure wherein the mirror is connected to the supporting structure by a plurality of torsional members and the supporting structure is connected to the second layer by a plurality of torsional members.

8. The process of claim 1 wherein the first substrate is bonded to the second substrate by a technique selected from the group consisting of fusion bonding, flip chip bonding and epoxy bonding.

9. The process of claim 1 further comprising depositing metal on the first and second major surfaces of the mirror element.

* * * * *